United States Patent Office 3,369,004
Patented Feb. 13, 1968

3,369,004
VULCANIZATION PROCESS
Laurence E. Stanton, Lisle, Ill., assignor to Nalco Chemical Company, Chicago, Ill., a corporation of Delaware
No Drawing. Filed Nov. 12, 1965, Ser. No. 507,579
6 Claims. (Cl. 260—79.5)

This invention relates to a novel process for curing rubber whereby the properties of said rubber are improved by a more efficient vulcanization step. Specifically, this invention consists of a process comprising incorporating into rubber sulfur, a primary accelerator and an activator which comprises the compounds of this invention, and thereafter heating said rubber to effect vulcanization.

The process of vulcanizing rubber may broadly be defined as a process wherein an elastomer or rubbery polymer is cross-linked to form a tough, strong and highly-elastic material known as cured rubber. Dry rubber, in a vulcanization process, is normally mixed with sulfur and thereafter heated to effect vulcanization. It is believed that the rubbery polymers or elastomers contain a number of unsaturated groups or double bonds in their molecules which react in some manner with sulfur and thereafter cross-link the polymer chains to produce cured rubber.

In addition to the sulfur, other materials known as accelerators are normally aded to reduce the vulcanization period to a commercially acceptable length of time. Rubber which is vulcanized in the presence of sulfur without an accelerator may not be completely vulcanized for even as long as several days. Further, unreacted sulfur present due to incomplete vulcanization is undesirable in the final product, since an excess of sulfur will cause crystallization to occur at the surface of the rubber.

A wide variety of compounds are used as accelerators to increase the rate of vulcanization. The function of the accelerator is to increase the rate of vulcanization, and, further, to assist in producing rubber of superior properties such as strength and elasticity. Organic compounds such as certain types of organic bases, thiazoles and thiocarbamates are well-known accelerators.

Essentially, all of the rubber produced at this time is vulcanized using a primary accelerator. The first accelerators which were used in vulcanization processes were inorganic in nature, with basic lead carbonate being disclosed in the original patent by Charles Goodyear. Later, as the state of the art advanced, various other inorganic materials, such as litharge, lime, magnesia, sodium hydroxide and the like were used to replace the lead carbonate. These inorganic materials, however, were found to be unsatisfactory, in general, and were replaced with various organic type accelerators. At the present time, organic accelerators are used exclusively as primary accelerating agents for the vulcanization of rubber.

Organic primary accelerators have been classified according to their chemical composition. Specifically, the vast majority of primary accelerators may be classified as (1) organic bases, (2) thiocarbamate, and (3) thiazole accelerators. Examples of organic bases are p-phenylenediamine, p-aminodiethylaniline, p-nitrosodimethylaniline, as well as the aldehyde-amines made from a reaction of amines such as aniline, toluidine and aliphatic amines such as butylamine with aldehydes such as formaldehyde, acetaldehyde and heptaldehyde. Other organic bases are the guanidines, such as diphenyl guanidine, and di-orthotolylguanidine, and the thiocarbanalides.

The second class enumerated above, thiocarbamate accelerators, comprise the dithiocarbamates and thiuram sulfides. Dithiocarbamates are secondary aliphatic amines which have been reacted with carbon disulfide to form salts of dithiocarbamate acids. Also, various metal salts such as the sodium salt and the zinc salt of these materials are used. Thiuram sulfides consist of dithiocarbamate acids which have been oxidized.

The third class, thiazole accelerators, comprises the greatest portion of primary accelerators now in use. Examples of these materials are mercaptobenzothiazole which is made from aniline and carbon disulfide, its salts and esters, as well as sulfenamide and its thiocarbamyl derivative. Also employed are the aliphatic thiazoles where one or more of the hydrogen atoms on the carbon atoms in mercaptobenzothiazole are replaced by an aliphatic group.

Oftentimes, however, the primary accelerator does not effect a sufficiently rapid rate of vulcanization without addition of a second material which is generally known in the rubber art as an activator. Normally, inorganic materials such as zinc oxide are employed as activators. Also, various organic materials may be employed such as, for example, when a thiazole is used as a primary accelerator, it is conventional to employ guanidines or dithiocarbamate to activate the thiazole. The properties of rubber which are improved by means of the use of an activator are higher strength as measured by modulus, tensile and elongation, and a more extended time during which these properties are at a maximum. The degree of vulcanization or cure is determined by balancing the amount of time necessary to achieve maximum tensile strength, modulus and elongation. Normally, these three properties do not achieve a maximum absolute value at the same time of curing. Consequently, activators are employed to extend the period of time at which one or more of these properties is a maximum in order to permit a closer realization of all three maximum properties. For example, a relatively flat modulus curve, that is where the modulus reaches a maximum in a short period of time and maintains that level for a relatively long period of time, allows the selection of the length of time of vulcanization then to be determined solely by the time required to achieve maximum tensile strength and/or elongation.

Activators are also employed to increase the absolute values of the properties of rubber. Many primary accelerators do not, when used alone, produce a rubber of sufficient strength. This is especially true when high absolute modulus is desired.

Yet another property of rubber which is sought to be improved by the use of activators is the resistance of rubber to aging. In many instances, rubber having high strength characteristics which are achieved through the use of an activator are subject to conditions during their ultimate use which adversely affect the strength properties over an extended period of time. Consequently, one of the primary characteristics of a good activator is the requirement that it does not adversely affect the strength of the rubber upon extended aging.

Furthermore, another property which rubber of especially high strength must possess is flexibility over extended use. Many of the ultimate uses of rubber require that the rubber be especially flexible and, at the same time, especially tough or strong. It is the function of an activator to provide these properties.

Accordingly, it would be of great advantage to the rubber manufacturing art to provide a process for vulcanizing rubber wherein an activator might be employed to more effectively achieve increase modulus and tensile strength, as well as maintain resistance to degradation upon aging or severe flexing.

Therefore, it is an object of this invention to provide an improved rubber vulcanization process.

It is also an object of this invention to provide a class of compounds which may be used as an activator in the vulcanization of rubber, whereby rubber having high modulus and tensile strength may be produced.

Yet another object of this invention is to provide a class of compounds useful as an activator in the vulcanization of rubber, whereby resistance to degradation by aging and/or flexibility is achieved.

It is a specific object of this invention to provide an activator comprising the reaction product of a fatty acid and an amine-type compound described hereinafter which may be used in the process of vulcanizing rubber.

Still another object of this invention is to provide a process whereby sulfur, a primary accelerator and the activator of this invention are incorporated into rubber followed by heating to effect vulcanization of said rubber.

Other objects will appear hereinafter.

In accordance with the invention, it has now been discovered that these and other objects of the invention may be accomplished in the following manner. Broadly, the invention comprises incorporating into rubber sulfur, a primary accelerator, and the activator of this invention, and thereafter heating said mixture to effect vulcanization of the rubber. It has been discovered that the use of the activator described hereinafter enables the production of rubber which has superior strength properties as exemplified by high modulus and tensile strength, and further, has exceptional resistance to both aging and adverse effects from flexing.

The activator of this invention may be generically defined as being the reaction product of a fatty acid and a compound having the formula $$H_2N(-R-\underset{H}{N}-)_xA$$

where R is a divalent lower alkylene radical, $x$ is an integer ranging from 1 to 5, and A is selected from the group consisting of —ROH and H. The term "reaction product," as used herein, is intended to refer only to condensation reaction products.

Specific examples of compounds having the above formula are the polyamines such as diethylene triamine, triethylene tetraamine, tetraethylene pentaamine, tripropylene tetraamine, and the like. Also, the various alkanolamines such as aminoethyl ethanolamine and its various homologues fall within the above-defined class of starting reactants.

Fatty acids which may be used herein may be any fatty acid having at least 7 carbon atoms, and preferably at least 12 carbon atoms. Examples of starting fatty acids that may be used in the preparation of the compounds of this invention are hexanoic, octanoic, decanoic, dodecanoic, tetradecanoic, hexadecanoic, octadecanoic, eicosanoic, docosanoic and tetracosanoic acids. Several illustrative unsaturated fatty acids useful as starting ingredients are dodecenoic, tetradecenoic, hexadecenoic, octadecenoic, eicodecenoic, octadecandienoic and 12-hydroxyoctadecenoic acids. The various fatty acids which occur in natural fats and oil may also be used. Thus, coconut, corn, cottonseed, linseed, palm, soybean, tall and tung oils as well as such fats as lard and tallow may be employed. An inexpensive solution of useful organic carboxylic acids are the petroleum acids derived from naphthenic acids.

Depending upon the mole ratio of starting materials, as well as temperature and other reaction conditions, a number of classes of compounds result from the reaction of the above-described starting materials. For example, monoamides, diamides, amidoesters and 1,2-substituted imidazolines may be obtained. The preferred classes of compounds which are reaction products of the above-described amines and fatty acids are set forth in detail below.

The first class of preferred activators which may be used in the process of this invention are monoamides having the formula:

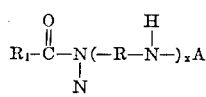

where R is a divalent lower alkylene radical, $x$ is an integer ranging from 1 to 5, A is selected from the group consisting of —ROH and H, and $R_1$ is an alkyl radical having at least 6 carbon atoms. It is preferred that $R_1$ be a lower alkyl radical having at least 11 carbon atoms. These materials may be conveniently prepared by a number of techniques using an approximately equal molar ratio of starting reactants. A most preferred activator of this class is a compound of the formula:

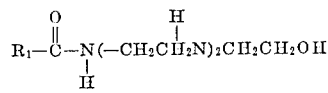

where $R_1$ is an alkyl radical having 17 carbon atoms. It should be noted that $R_1$ is derived from the fatty acid used as a starting reactant, while the amide group is formed by the reaction of the acid and terminal amine group of the starting polyamine or alkanolamine. The balance of the structure of the compounds of this class is formed from the remaining unreacted portion of the polyamine or alkanolamine. It has been found that compounds of this class produced by reacting any of the above-mentioned fatty acids with any of the polyamines or alkanolamines described hereinabove may be used in the process of this invention.

The second class of compounds useful as activators in the process of this invention may be defined as being a diamide having the formula:

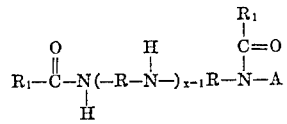

where R is a divalent lower alkylene radical, $x$ is an integer ranging from 1 to 5, A is selected from the group consisting of —ROH and H, and $R_1$ is an alkyl radical having at least 6 carbon atoms.

It is more preferred where $R_1$ is an alkyl radical having at least 11 carbon atoms. Of the activators of this class, especially preferred is a compound having the formula:

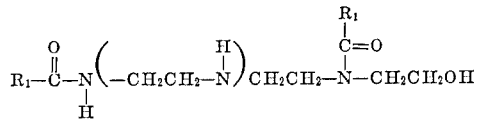

where $R_1$ is an alkyl radical having 17 carbon atoms. These materials are generally prepared with a 2:1 mole ratio of fatty acid to polyamine or alkanolamine. Again, it should be pointed out that $R_1$ is derived from the fatty acid, the amide groups are formed by reaction between the acid group and the amine groups, and the balance of the structure is derived from the polyamine or alkanolamine reactant.

The third preferred class of activators formed by the reaction of the fatty acid and the polyamine or alkanolamine are 1,2-substituted imidazolines which contain at least one alkyl group of at least 6 carbon atoms. These materials are prepared by well-known techniques wherein the fatty acid and the polyamine or alkanolamine are first reacted, followed thereafter by an azeotrope distillation with solvents such as toluene or benzene to effect ring closure. Particularly preferred activators in this class are 1,2-substituted imidazolines of the formula:

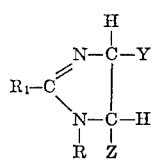

where $R_1$ is an alkyl group containing at least 11 carbon atoms, R is selected from the group consisting of hydrogen, lower alkyl groups containing not more than 6 carbon atoms, $CH_2CH_2OH$ and $(CH_2CH_2NH)_xH$ where $x$ is an integer ranging from 1 to 3, and Y and Z are selected from the group consisting of hydrogen and lower alkyl groups containing not more than 6 carbon atoms. Most preferred are 1,2-substituted imidazolines for use as activators in the process of this invention which may be selected from the group of compounds having the formula:

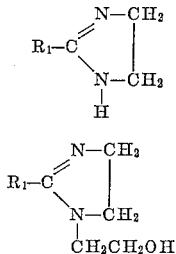

and

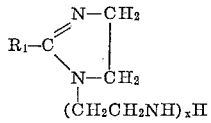

where $R_1$ is an alkyl radical having at least 11 carbon atoms and $x$ is an integer ranging from 1 to 3. Of these compounds, most preferred are 1-(2-hydroxyethyl)-2-heptadecenyl imidazoline, and 1(2-aminoethyl)-2-heptadecenyl imidazoline.

As stated above, the process of this invention comprises vulcanizing rubber by incorporating sulfur, a primary accelerator and an activator, as described hereinabove, into rubber followed by heating to effect vulcanization of said rubber. The particular rubbery polymers or elastomers which may be vulcanized by the process of this invention may be defined as being any solid rubbery polymer which may be vulcanized by means of the process known as dry rubber vulcanization. In this process, raw rubber in the dry state is mixed with sulfur and a primary accelerator, as well as a wide variety of fillers, dyes or pigments and other specialty additives, formed into the desired shape and vulcanized by heating. It is preferred, for the purposes of this invention, to heat said rubber to a temperature ranging from about 200° to 500° F. and preferably from 250° to 400° F.

Examples of the various rubbers which may be utilized in the process of this invention are natural rubber, and synthetic rubbers such as butadiene-styrene copolymers, butadiene-acrylonitrile copolymers, isobutylene-isoprene copolymers, polymers of 2-chloro-1,3-butadiene and copolymers of this monomer and other monomers, polyacrylates such as copolymers of ethyl acrylate and chloroethylvinyl ether, and the like.

It is contemplated that the amount of sulfur to be used in the vulcanization process of this invention be the conventional amount which is normally used in rubber compounding processes. It is not necessary to vary the sulfur content other than is normally done in conventional processes. The process of this invention has been found to be effective in achieving the desired objects of this invention without any variation in the amount of sulfur employed.

It has been found that the primary accelerators which are useful in the instant process are those which are normally employed in rubber vulcanization processes. A preferred class of primary accelerators are those in the above-described group consisting of organic base, thiocarbamate and thiazole accelerators. Particularly preferred are primary accelerators of the thiazole class. The amount of primary accelerator which is to be used in the instant process will vary widely depending upon the extent of cure and ultimate properties of the rubber therein produced. Generally from 0.1 to 10 parts per 100 parts of dry rubber of the primary accelerator are employed. A preferred range of primary accelerator is from 0.1 to 5 parts per 100 parts of rubber.

The activators of this invention, as defined above, may be incorporated into said rubber in the same amounts which are normally utilized in the rubber compounding art. It has been found to be especially effective to incorporate from 0.1 to 5 parts per 100 parts of rubber of the activator in the process of this invention.

Rubber which has been vulcanized according to the process of this invention has been found to possess superior strength as evidenced by high modulus and tensile strength, while, at the same time, demonstrating effective resistance to degradation from aging or extensive flexing. The following examples are presented by way of illustration to more clearly demonstrate the various embodiments of the invention. However, these examples are merely illustrative, and are not to be considered limiting on the scope of the appended claims.

Example I

In this example, a typical vulcanization process was used to vulcanize a butadiene-styrene copolymer available commercially under the trademark Plioflex. The particular formulation which was used represents a conventional shoe sole formulation and included a hard clay filler, softening agents, reinforcing agents, a pigment and a primary accelerator comprising a sulfenamide type accelerator commercially known as Santocure. To this mixture was added 3.5 parts of sulfur per 100 parts of the rubber copolymer. Prior to vulcanization, 0.55 part per 100 parts of dry rubber of a number of typical activators of this invention were dispersed in the formulation. Portions of these uncured rubber compositions were then vulcanized by heating at a temperature of 315° F. to effect vulcanization of said rubber. Presented below in Table I is the resulting ultimate tensile strengths of samples of the above rubber, cured for various periods of time. The tensile strength was measured according to ASTM standard testing methods and is reported in pounds of load required to break or rupture the samples. As can be seen from Table I below, a completely satisfactory tensile strength was achieved within a commercially acceptable length of time. The rubber produced according to this example was considered to be completely satisfactory for its intended purpose for use in shoe sole manufacture.

Batch A in this example was prepared using an activator comprising the reaction product of tetraethylene pentamine and oleic acid under conditions to yield a 1,2-substituted imidazoline. Batch B was similarly prepared using a monoamide derived from the same starting reactants as batch A. Batch C was likewise prepared using a mixed fatty acid containing alkyl chains which were predominantly heptadecenyl and heptadecadienyl reacted with aminoethyl ethanolamine under conditions to yield a 1,2-substituted imidazoline.

TABLE I.—TENSILE STRENGTH OF RUBBER, VULCANIZED USING AN ACTIVATOR

| Batch No. | Tensile Strength in Pounds for Varying Cure Time | | | |
|---|---|---|---|---|
| | 7 min. | 10 min. | 15 min. | 20 min. |
| A | 1,690 | 1,760 | 1,690 | 1,680 |
| B | 1,770 | 1,790 | 1,720 | 1,730 |
| C | 1,750 | 1,810 | 1,760 | 1,710 |

Example II

This example illustrates the improvement in resistance to aging which may be achieved by the process of this invention in comparison to prior art processes using a conventional activator. A number of rubber formulations similar to those described in Example I were prepared with the only variable being the activator. The rubber was vulcanized at a temperature of 315° F. for 15 minutes in each experiment. In batch F, 0.75 part per 100 parts of rubber of a conventional activator, diortho-tolyl-guanidine, was employed. Batches A, B and C were the same as those in Example I described above. Batch D contained as an activator 1-(2-hydroxyethyl)-2-heptadecenyl-2-imidazoline. Batch E contained 1-(2-aminoethyl)-2-heptadecenyl-2-imidazoline as an activator. In each case, 0.55 part per 100 parts by dry rubber of the activators of this invention were used.

After curing, each of the samples prepared as above were evaluated under conditions simulating extensive aging. Specifically, the samples were aged in an oxygen bomb for 120 hours at a pressure of 300 p.s.i. and at a temperature of 158° F. The samples were then tested according to ASTM procedures to determine the modulus, tensile strength and elongation. The results of these tests are presented below in Table II. As can be seen from the results of the tests, use of the prior art activator resulted in a vulcanized rubber which was severely weakened under the aging conditions of this example. In point of fact, the prior art product did not even possess sufficient elongation to enable measurement of the modulus at 300% elongation. The rubber products prepared according to the process of this invention, however, were completely satisfactory in their aged properties, and were deemed suitable for their intended use.

TABLE II.—EFFECT OF ACTIVATORS ON AGED PHYSICAL PROPERTIES

| Batch No. | Modulus 300% | Tensile Strength, pounds | Elongation, percent |
| --- | --- | --- | --- |
| A | 1,130 | 1,350 | 395 |
| B | 1,160 | 1,410 | 390 |
| C | 1,100 | 1,460 | 433 |
| D | 1,210 | 1,430 | 357 |
| E | 1,230 | 1,470 | 400 |
| F |  | 1,060 | 170 |

*Example III*

Yet another property of rubber which has been found to be adversely affected when prior art activators are employed is the flexibility of the rubber. Samples of rubber prepared by the process and evaluated by a standard testing procedure known as the Ross Flex test method, which testing method is a standard ASTM test. In this procedure, the samples are aged for 24 hours at 100° C. Then the samples are pierced to give a 0.1 inch cut in the center of the sample. Next the samples are clamped in a device which flexes the sample at a standard rate and a standard angle. The number of flexes which are required to "grow" the cut to various lengths is counted. Samples requiring a greater number of flexes to grow the cut to a given length are considered to be more resistant to degradation by flexing. Presented below in Table III are the results of flexing experiments on a number of samples prepared by the process of this invention. Also shown in the table are the results of similar experiments using prior art prepared rubber. Specifically, the samples designated as batches D and F were taken from Example II. As can be seen from the results presented in Table III, batch D, which was prepared according to the process of this invention, was substantially superior to the prior art process material represented by batch F. The prior art material was not considered to be an acceptable grade of rubber, while rubber produced by the process of this invention is completely suitable for ultimate use where a high resistance to severe flexing is required.

TABLE III.—EFFECT OF ACTIVATORS ON RUBBER SUBJECTED TO SEVERE FLEXING

| Batch No. | Flexes Required to Increase Cut Length | | | | |
| --- | --- | --- | --- | --- | --- |
|  | 0.2" | 0.3" | 0.4" | 0.5" | 0.6" |
| D | 700 | 8,500 | 19,000 | 26,500 | 35,500 |
| F | 100 | 400 | 1,750 | 4,500 | 7,500 |

As has been demonstrated in the preceding examples, rubber which has been vulcanized using the process of this invention, wherein sulfur, a primary accelerator and an activator comprising the reaction product of a fatty acid as defined herein, and a compound of the formula:

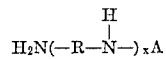

where R is a divalent lower alkylene radical, $x$ is an integer ranging from 1 to 5, and A is selected from the group consisting of —ROH and H, are incorporated into said rubber followed by heating to effect vulcanization of said rubber, has been shown to result in cured rubber having superior properties. It has also been found that the activators of this invention may be satisfactorily used with any of the normal rubber additives such as carbon black, dyes, fillers, reinforcing agents, softening agents and the like without adverse effect.

It is apparent that many modifications and variations of the invention may be practiced other than those specifically enumerated without departing from the true scope of the invention.

The invention is hereby claimed as follows:

1. A process for vulcanizing rubber comprising incorporating into said rubber sulfur, from 0.1 to 10 parts per 100 parts of said rubber of a primary accelerator selected from the group consisting of organic base, thiocarbamate and thiazole accelerators, and from 0.1 to 5 parts per 100 parts of said rubber of an activator comprising a 1,2-substituted imidazoline of the formula:

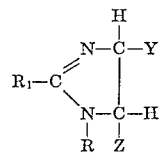

where $R_1$ is an aliphatic group containing at least 11 carbon atoms R is selected from the group consisting of hydrogen, lower alkyl groups containing not more than 6 carbon atoms, $CH_2CH_2OH$ and $(CH_2CH_2NH)_xH$ where $x$ is an integer ranging from 1 to 3, and Y and Z are selected from the group consisting of hydrogen and lower alkyl groups containing not more than 6 carbon atoms, and thereafter heating said rubber to effect vulcanization.

2. The process of claim 1 where said imidazoline has a formula selected from the group consisting of:

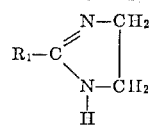

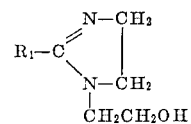

and

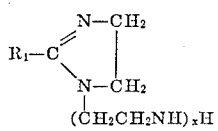

where $R_1$ is an alkyl radical having at least 11 carbon atoms and $x$ is an integer ranging from 1 to 3, and thereafter heating said rubber to effect vulcanization.

3. The process of claim 2 where said primary accelerator is a thiazole accelerator.

4. The process of claim 2 where the 1,2-substituted imidazoline is 1-(2-hydroxyethyl)-2-heptadecenyl imidazoline.

5. The process of claim 2 where the 1,2-substituted imidazoline is 1-(2-aminoethyl)-2-heptadecenyl imidazoline.

6. A composition comprising a sulfur vulcanizable rubber as a major portion, sulfur, from 0.1 to 10 parts per 100 parts of said rubber of a primary accelerator selected from the group consisting of organic base, thiocarbamate and thiazole accelerators, and from 0.1 to 5 parts per 100 parts of said rubber of an activator comprising a 1,2-substituted imidazoline of the formula:

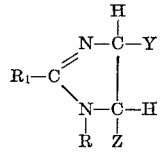

where $R_1$ is an alkyl group containing at least 11 carbon atoms and R, Y and Z are selected from the group consisting of hydrogen and lower alkyl groups containing not more than 6 carbon atoms.

References Cited

FOREIGN PATENTS 311,735  3/1930  Great Britain.

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,369,004            February 13, 1968

Laurence E. Stanton

It is certified that error appears in the above identified patent and that said Letters Patent are hereby corrected as shown below:

Column 1, line 24, "aded" should read -- added --.
Column 3, lines 71 to 75, the formula should appear as shown below

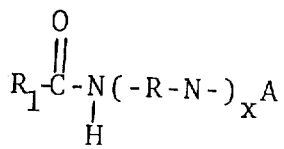

Signed and sealed this 4th day of November 1969.

(SEAL)
Attest:

Edward M. Fletcher, Jr.
Attesting Officer

WILLIAM E. SCHUYLER, JR.
Commissioner of Patents